United States Patent
Ji et al.

(10) Patent No.: US 9,921,426 B2
(45) Date of Patent: Mar. 20, 2018

(54) DISPLAY WITH BLUE PIGMENT LAYER UNDER BLACK MATRIX

(71) Applicant: LG Display Co., Ltd., Seoul (KR)

(72) Inventors: Sung Won Ji, Goyang-si (KR); Ho Chun Lee, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/897,089

(22) PCT Filed: Jun. 17, 2013

(86) PCT No.: PCT/US2013/046182
§ 371 (c)(1),
(2) Date: Dec. 9, 2015

(87) PCT Pub. No.: WO2014/204436
PCT Pub. Date: Dec. 24, 2014

(65) Prior Publication Data
US 2016/0131938 A1    May 12, 2016

(51) Int. Cl.
*G02F 1/1335* (2006.01)
*G02F 1/1333* (2006.01)

(52) U.S. Cl.
CPC .. *G02F 1/133512* (2013.01); *G02F 1/133514* (2013.01); *G02F 1/133516* (2013.01);
(Continued)

(58) Field of Classification Search
CPC .................. G02F 1/133512; G02F 1/133514
See application file for complete search history.

(56) References Cited

U.S. PATENT DOCUMENTS 6,392,729 B1    5/2002    Izumi et al.
2005/0147899 A1  7/2005   Sun et al.
(Continued)

FOREIGN PATENT DOCUMENTS

CN    1538194    10/2004
CN    102736314  10/2012
(Continued)

OTHER PUBLICATIONS

Office Action for Chinese Patent Application No. CN 201380077501.3, dated Jul. 28, 2017, 16 Pages, (With English Translation).
(Continued)

*Primary Examiner* — Jia Pan
(74) *Attorney, Agent, or Firm* — Fenwick & West LLP

(57) ABSTRACT

A liquid crystal display has a color filter layer and a thin-film transistor layer surrounding a layer of liquid crystal material. The display may have an active area with an array of display pixels. An inactive area may surround the active area. A black mask structure may be formed in the inactive area. A black matrix having a grid shape with rectangular openings may be formed in the active area. Red, green, and blue color filter elements may be formed in the rectangular openings. The black matrix may have a first layer that is formed from a grid of blue photoresist on a color filter substrate and a second layer that is formed from an aligned grid of black photoresist. In the inactive area, the black mask structure may be formed a layer of blue photoresist covered with a layer of black photoresist.

18 Claims, 5 Drawing Sheets

(52) U.S. Cl.
CPC ............... *G02F 1/133528* (2013.01); *G02F 2001/133357* (2013.01); *G02F 2001/133388* (2013.01)

(56) References Cited

U.S. PATENT DOCUMENTS

| | | | |
|---|---|---|---|
| 2007/0002218 A1 | 1/2007 | Park et al. | |
| 2011/0249339 A1* | 10/2011 | Horie | G02F 1/133512 359/601 |
| 2013/0128193 A1* | 5/2013 | Yang | G02F 1/133502 349/106 |
| 2015/0301400 A1* | 10/2015 | Kimura | G02F 1/133512 349/43 |
| 2015/0301402 A1* | 10/2015 | Kimura | G02F 1/133512 349/69 |

FOREIGN PATENT DOCUMENTS

| | | |
|---|---|---|
| JP | H07318950 | 12/1995 |
| JP | 2013047720 | 3/2013 |
| TW | 201321835 | 6/2013 |

OTHER PUBLICATIONS

Notification of Reason for Refusal for Korean Patent Application No. KR 10-2015-7035657, dated Dec. 11, 2017, 11 Pages (With English Translation).

* cited by examiner

DISPLAY WITH BLUE PIGMENT LAYER UNDER BLACK MATRIX

BACKGROUND

This relates generally to displays, and more particularly, to displays with color filter layers.

Electronic devices such as computers and handheld electronic devices have displays such as liquid crystal displays. A liquid crystal display typically has a rectangular central active area surrounded by a ring-shaped inactive area. An array of display pixels in the active area is used in displaying images for a user. A color filter layer formed from an array of color filter elements such as red, blue, and green pigments is used to provide the display with the ability to display color images. The color filter layer includes a black mask in the inactive area.

The black mask is formed from a polymer black masking layer and is used to hide internal display components from view. Portions of the black masking layer are used to create a grid-shaped black matrix in the active area of the display. The black matrix has rectangular openings that are covered by the color filter elements.

In some color filter layer arrangements, the black matrix is formed on the surface of a color filter substrate before the color filter elements are deposited. This can give rise to undesirably large amounts of reflected light from the black matrix during use of the display. By forming the black matrix after patterning the color filter elements on a color filter substrate, reduced amounts of black matrix are formed in spaces between adjacent color filter elements, thereby reducing black matrix reflections. If care is not taken, however, black matrix reflections may still be larger than desired.

It would therefore be desirable be able to reduce black matrix reflections in the color filter layer of a display.

SUMMARY

A liquid crystal display may be provided with a color filter layer and a thin-film transistor layer. The color filter layer may have a glass substrate covered with color filter element structures. The thin-film transistor layer may have a glass substrate covered with thin-film transistor circuitry. A layer of liquid crystal material may be interposed between the color filter layer and the thin-film transistor layer. Upper and lower polarizer layers may be formed above and below the color filter layer and the thin-film transistor layer.

The display may have an active area with an array of display pixels. An inactive area may surround the active area. A black mask structure may be formed in the inactive area. A black matrix having a grid shape with rectangular openings may be formed in the active area.

Red, green, and blue color filter elements may overlap the rectangular openings of the black matrix. The black matrix may have a first layer that is formed from a grid of blue photoresist that is deposited and patterned directly on an inner surface of the color filter substrate and may have a second layer that is formed from an aligned grid of black photoresist. Edge portions of the color filter elements may be interposed between the the grid of blue photoresist and the aligned grid of black photoresist.

In the inactive area, the black mask structure may be formed a layer of blue photoresist covered with a layer of black photoresist.

Further features, their nature and various advantages will be more apparent from the accompanying drawings and the following detailed description of the preferred embodiments.

DETAILED DESCRIPTION

Figure 1:
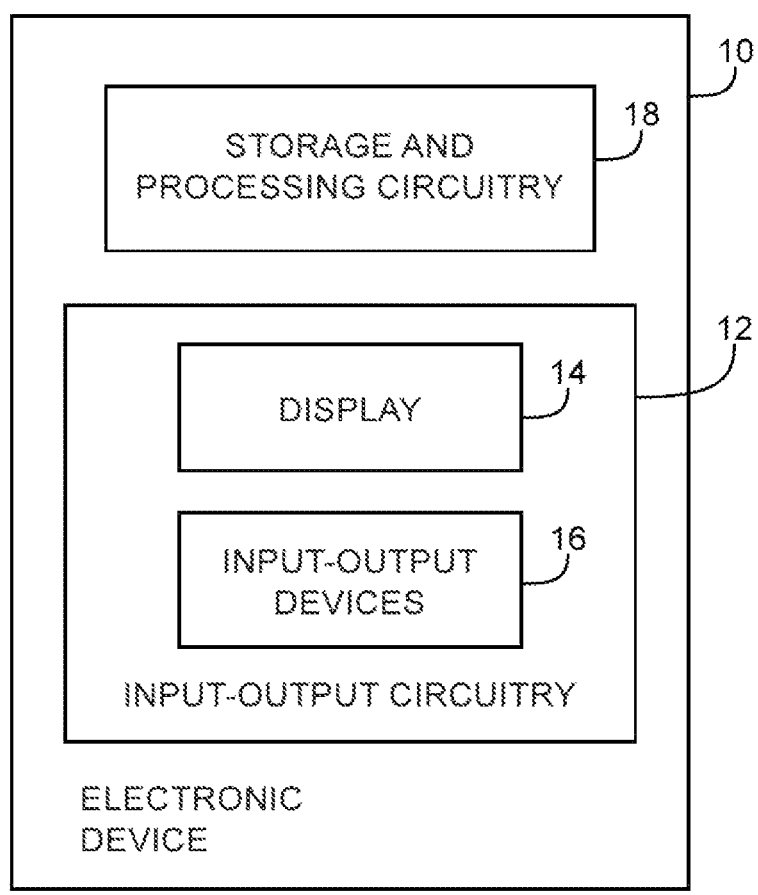
FIG. 1 is a schematic diagram of an electronic device of the type that may be provided with a display in accordance with an embodiment of the invention.

An illustrative electronic device of the type that may be provided with a display is shown in FIG. 1. Electronic devices such as illustrative electronic device 10 of FIG. 1 may be laptop computers, tablet computers, cellular telephones, media players, other handheld and portable electronic devices, smaller devices such as wrist-watch devices, pendant devices, headphone and earpiece devices, other wearable and miniature devices, or other electronic equipment.

As shown in FIG. 1, device 10 may include storage and processing circuitry 18 and input-output circuitry 12. Storage and processing circuitry 18 may include storage such as hard disk drive storage, nonvolatile memory (e.g., flash memory or other electrically-programmable-read-only memory configured to forma solid state drive), volatile memory (e.g., static or dynamic random-access-memory), etc. Processing circuitry in storage and processing circuitry 18 may be used to control the operation of device 10. This processing circuitry may be based on one or more microprocessors, microcontrollers, digital signal processors, application specific integrated circuits, etc.

Input-output circuitry 12 may be used to receive input from users and the environment and may be used to supply output to users and external equipment. Input-output circuitry 12 may include input-output devices 16 such buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, wireless and wired communications circuitry, etc. Input-output circuitry 12 may also include displays such as display 14. Display 14 may be a touch screen display or may be a display that is insensitive to touch input. Examples of touch screen displays include displays that have arrays of capacitive touch sensor electrodes. Other types of touch sensor arrays may be incorporated into display 14 if desired.

Figure 2:
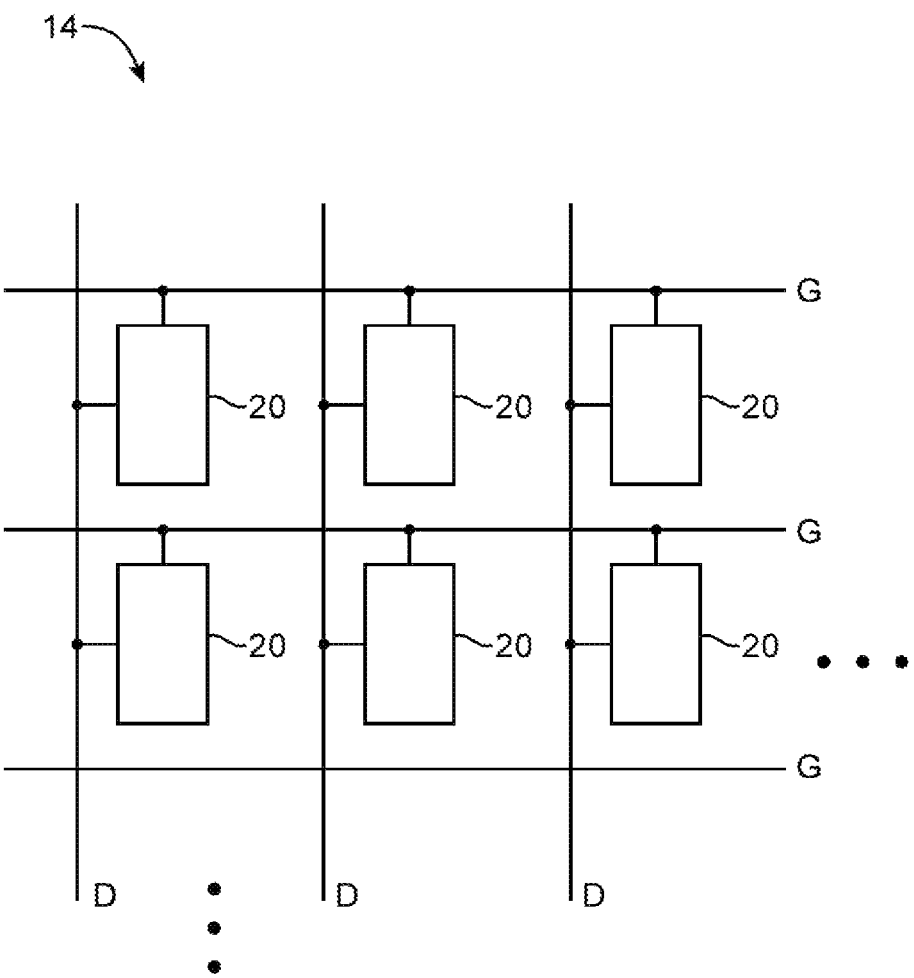
FIG. 2 is a diagram of an illustrative array of display pixels in a display in accordance with an embodiment of the present invention.

Display 14 may be a liquid crystal display having an array of display pixels such as display pixels 20 of FIG. 2. Each pixel 20 may have circuitry such as thin-film transistor circuitry, electrodes, and a storage capacitor for controlling electric fields that are applied to a corresponding portion of a liquid crystal layer. Gate lines G and data lines D may be used in distributing display control signals to display pixels 20.

Figure 3:
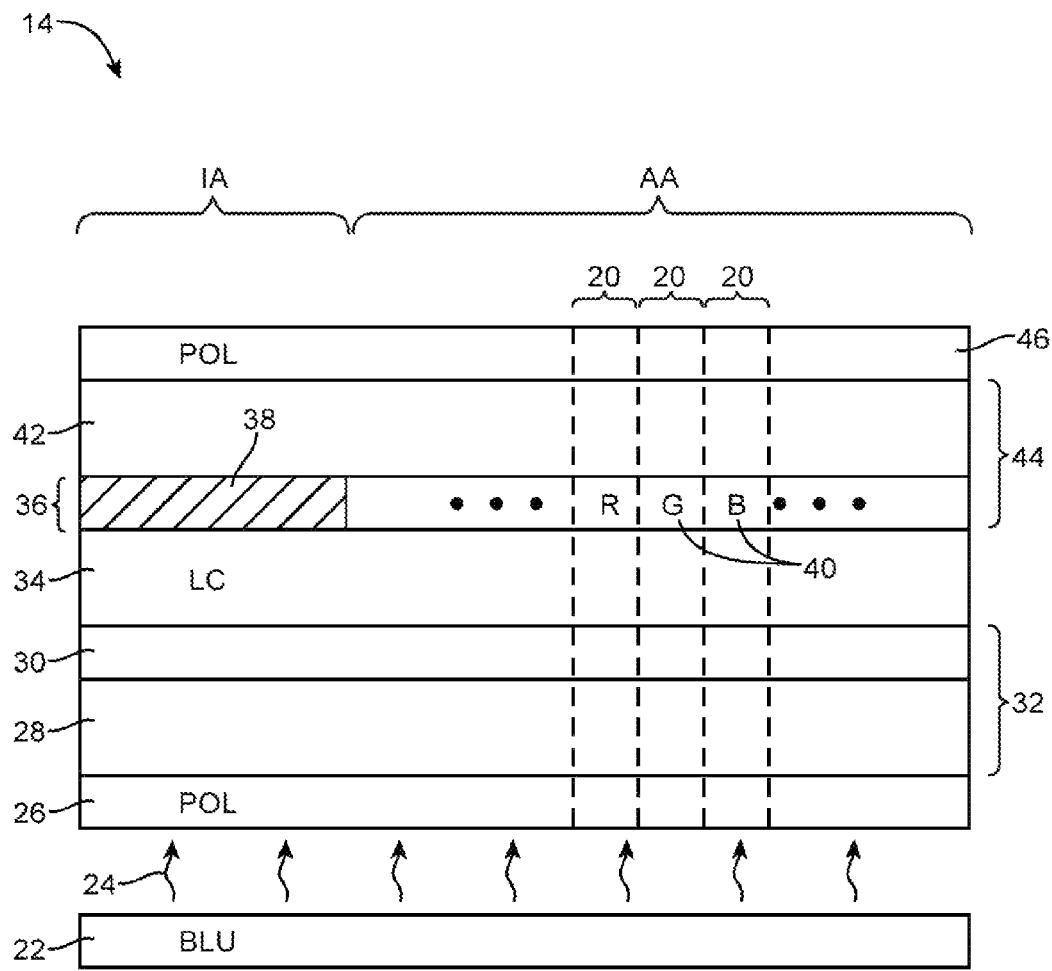
FIG. 3 is a cross-sectional side view of an illustrative display in accordance with an embodiment of the present invention.

A cross-sectional side view of display 14 is shown in FIG. 3. Backlight unit 22 may be based on a fluorescent light bulb or an array of light-emitting diodes. Backlight unit 22 may produce backlight 24 that travels vertically through the display layers of display 14 in direction Z.

Display 14 includes upper and lower polarizers 26 and 46. Circuitry (e.g., electrodes) of display pixels 20 are used to control the electric field applied to liquid crystal layer 34. By controlling the electric field, the liquid crystal layer can control the polarization of light 24 in each display pixel as the light passes through liquid crystal layer 34, thereby controlling the brightness of each pixel 20.

Liquid crystal layer 34 is sandwiched between thin-film transistor layer 32 and color filter layer 44. Thin-film transistor layer 32 includes a clear substrate such as glass substrate 28 and a layer of thin-film transistor circuitry 30 (e.g., polysilicon and/or amorphous silicon transistors, pixel electrodes, gate lines and data lines, etc.).

Color filter layer 44 includes a clear substrate such as glass substrate 42. Display 14 may have a rectangular shape. A rectangular central region that is sometimes referred to as active area AA may contain a rectangular array of display pixels 20 and can be used to display images for a user. A rectangular ring-shaped inactive border region that is sometimes referred to as inactive area IA may surround active area AA.

Color filter layer 44 may include a layer of color filter structures 36 on substrate 42. In inactive area IA, color filter structures 36 may include a strip of opaque masking material such as black masking material 38 that forms an opaque border called a black mask. In active area AA, color filter structures 36 may include an array of color filter elements 40. The material that is used in forming black masking material 38 and color filter elements 40 may be pigmented polymer (i.e., black photoresist for material 38 and colored photoresist such as red, green, and blue photoresist for color filter elements 40).

Figure 4:
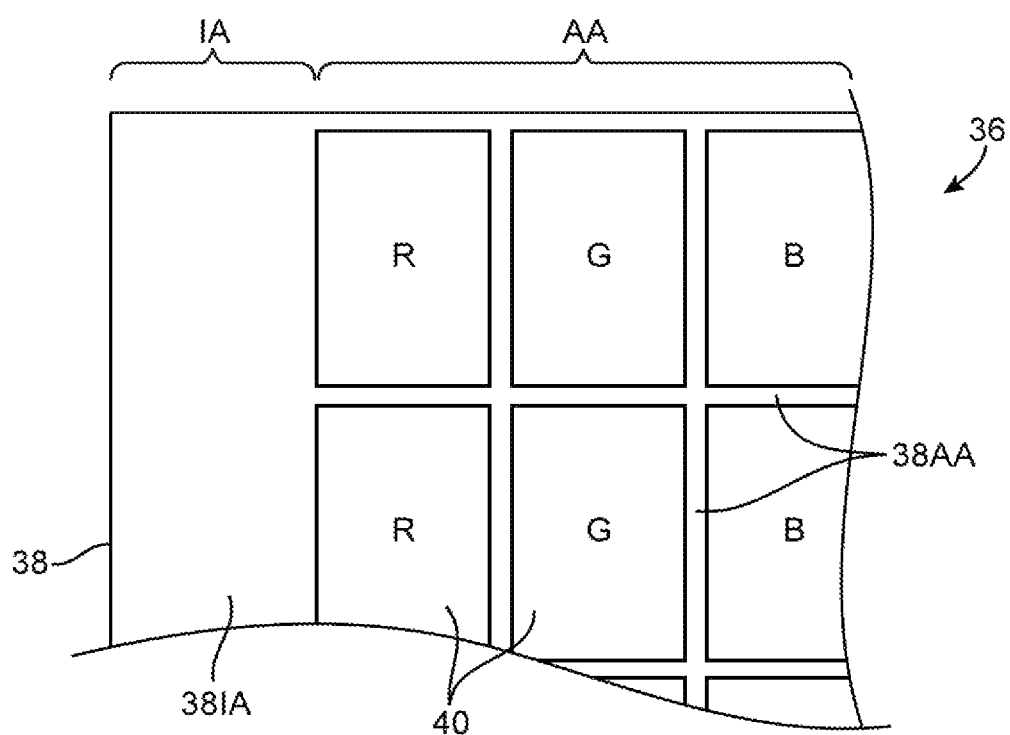
FIG. 4 is a top view of a portion of a color filter for a display in accordance with an embodiment of the present invention.

FIG. 4 is a top view of an illustrative portion of color filter layer structures 36. In inactive region IA, black masking material 38 may be used in forming an opaque border structure such as black mask 38IA. In active region AA, color filter elements 40 such as red (R), green (G), and blue (B) filter elements may be organized in an array having rows and columns of elements. Portions of black masking material 38 may be used in forming an opaque grid between respective color filter elements to help reduce color bleeding between adjacent pixels. The opaque grid formed using black masking material 38 may sometimes be referred to as a black matrix. As shown in FIG. 4, black matrix 38AA forms a grid with a series of rectangular openings each of which is overlapped by a respective color filter element 40.

Figure 5:
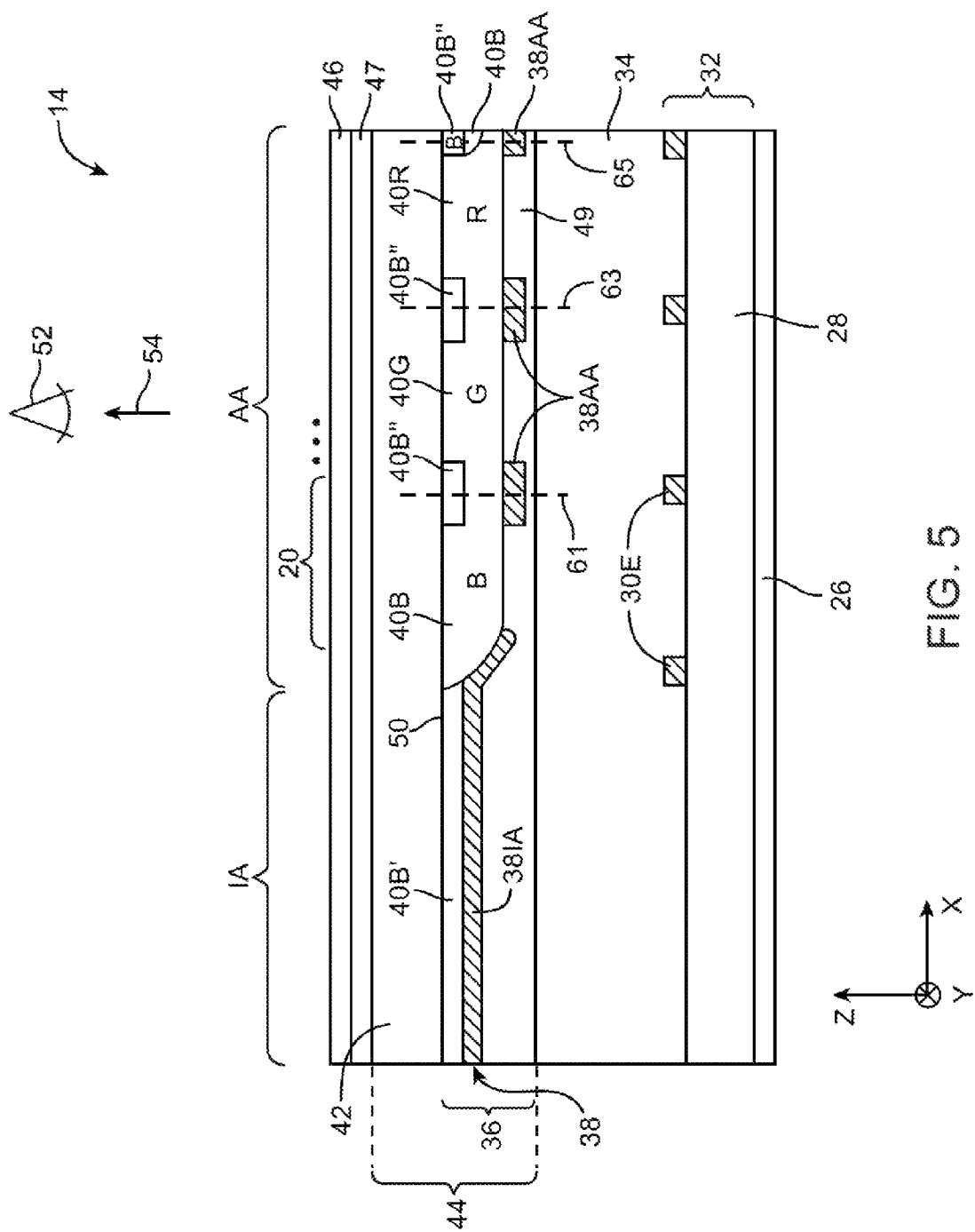
FIG. 5 is a cross-sectional side view of a portion of a display showing how color filter layer structures may be formed in accordance with an embodiment of the present invention.

A cross-sectional side view of display 14 showing how color filter element structures 36 may be configured to reduce undesired black masking material reflections from the surface of display 14 is shown in FIG. 5. As shown in FIG. 5, indium tin oxide layer 47 (e.g., a shielding layer) may be interposed between upper polarizer 46 and color filter layer substrate 42. Other layers may be incorporated into display 14 if desired (e.g., antireflection coating layers, anti-smudge layers, etc.). Thin-film transistor layer 32 may include metal display pixel electrodes 30E on glass substrate 28. Electrodes 30E are associated with display pixels 20 and are used in applying an adjustable electric field to an associated overlapping portion of liquid crystal layer 34.

Black masking material 38 may include patterned material such as material 38IA in inactive area IA and material 38AA in active area AA. Inner layer 50 of color filter substrate 42 faces liquid crystal layer 34. In the configuration of FIG. 5, blue color filter element material has been interposed between black masking material 38 and inner surface 50. This reduces the amount of light that reflects in direction 54 towards viewer 52 from the black mask and black matrix in color filter layer 44, thereby enhancing image quality on display 14.

The blue color filter material (blue photoresist) that is formed in color filter layer 44 may include material 40B for forming blue color filter elements (e.g., rectangular color filter elements 40 of FIG. 4). Material 40B may have a first thickness. The blue color filter material that is formed in color filter layer 44 may also include regions of a second thickness that is smaller than the first thickness such as regions 40B' and 40B". These thinner regions of blue color filter element material (e.g., a blue pigmented polymer such as blue photoresist) may help reduce black masking layer reflections from material 38.

In active area AA, blue color filter material 40B" can be formed in a grid that is aligned with a corresponding grid of black masking material 38AA. In active area AA, the black matrix is therefore formed using a blue matrix layer formed from a grid of blue photoresist 40B" and an aligned overlapping grid of black photoresist 38AA.

The pigmented photoresist that is used in forming layers 40B', 40B", and 40B may be deposited in one or more steps. For example, a half-tone photolithographic mask may be used during photolithographic patterning operations so that blue photoresist is deposited and patterned to form a layer that has thicker portions (for color filter elements) and thinner portions (structures 40B' and 40B"). As another example, the blue photoresist may first be deposited in a thin patterned layer (a layer including border portions 40B' and grid pattern 40B"), followed by a second (thicker) layer associated with blue color filter elements 40B.

After forming blue photoresist structures 40B', 40B", and 40B, the other color filter elements for color filter layer 36 may be formed. For example, following formation of the blue photoresist structures, a green photoresist layer may be deposited and patterned to form green color filter element structures 40G of FIG. 5, followed by deposition and patterning of a red photoresist layer to form red color filter element structures 40R of FIG. 5.

As shown in FIG. 5, because the photoresist structures of color filter layer 44 are formed in layers, some color filter layer structures (e.g., edge portions of the color filter elements) overlap portions of previously deposited color filter layer structures. For example, along vertical line 61, blue color structure 40B" is formed on inner surface 50 of substrate 42, an edge portion of blue color filter element 40B overlaps blue color structure 40B", a portion of the edge of green color filter element 40G overlaps the edge of blue color filter element 40B, and a portion of black matrix material 38AA overlaps the edge of green color filter element 40G. Similarly, along vertical line 63, blue color structure 40B" is formed on inner surface 50 of substrate 42, a portion of green color filter element 40G overlaps blue color structure 40B", a portion of the edge of red color filter element 40R overlaps the edge of green color filter element 40G, and a portion of black matrix material 38AA overlaps the edge of red color filter element 40R. Along vertical line 65, blue color structure 40B" is formed on inner surface 50 of substrate 42, a portion of blue color filter element 40B overlaps blue color structure 40B", a portion of the edge of red color filter element 40R overlaps the edge of blue color filter element 40B, and a portion of black matrix material 38AA overlaps the edge of red color filter element 40R. There are therefore portions of color filter elements that are interposed between the blue photoresist grid and the aligned black photoresist grid that form the black matrix.

In the illustrative configuration shown in FIG. 5, green color filter elements are deposited after blue color filter elements and red color filter elements are deposited after green color filter elements. If desired, red and green color filter elements may be formed in the opposite order (i.e., red color filter elements 40R may be formed after blue color filter elements 40B, but before green color filter elements 40G, so that the green color filter elements have edge portions that overlap edge portions of the red color filter elements and edge portions that overlap edge portions of the blue color filter elements).

After the blue, green, and red photoresist color filter layer structures have been deposited and patterned, the black photoresist of layer 38 may be deposited and patterned to form the black photoresist strips 38IA associated with the black mask in the opaque border in inactive area IA and to form the black photoresist grid 38AA in the black matrix of active area AA. Clear overcoat layer 49 may be deposited to cover the blue, green, and red color filter elements.

The use of blue color filter element material 40B' under black mask 38IA in inactive area IA may help create a seamless transition between inactive area IA and active area AA, by equalizing the reflectivity of the black mask formed from layers 38IA and 40B' and the black matrix formed from layers 40B" and 38AA.

The foregoing is merely illustrative of the principles of this invention and various modifications can be made by those skilled in the art without departing from the scope and spirit of the invention. The foregoing embodiments may be implemented individually or in any combination.

What is claimed is:

1. A display having an active area surrounded by an inactive area, comprising:
    a thin-film transistor layer;
    a color filter layer substrate;
    a layer of liquid crystal material interposed between the thin-film transistor layer and the color filter layer substrate;
    a black matrix in the active area and the inactive area on the color filter layer substrate, wherein the black matrix has openings; and
    an array of color filter elements in the active area each of which overlaps a respective one of the openings, wherein the black matrix includes a grid of blue photoresist structures in the active area and an overlapping aligned grid of black photoresist structures in the active area, and a blue photoresist layer in the inactive area and a black photoresist layer covering the blue photoresist layer in the inactive area,
    wherein some of each of the color filter elements is provided under the grid of blue photoresist structures and over the overlapping aligned grid of black photoresist structures, and overlaps the grid of blue photoresist structures and the overlapping aligned grid of black photoresist structures in a vertical direction, and
    wherein the black photoresist layer is in contact with the blue photoresist layer, and extends to a lower surface of an outermost color filter element of the array of color filter elements.

2. The display defined in claim 1 wherein the color filter elements include blue color filter elements, green color filter elements, and red color filter elements.

3. The display defined in claim 2 wherein the green color filter elements have edge portions that overlap edge portions of the blue color filter elements.

4. The display defined in claim 3 wherein the red color filter elements have edge portions that overlap edge portions of the green color filter elements.

5. The display defined in claim 4 wherein the red color filter elements have edge portions that overlap edge portions of the blue color filter elements.

6. The display defined in claim 2 wherein the red color filter elements have edge portions that overlap edge portions of the blue color filter elements.

7. The display defined in claim 6 wherein the green color filter elements have edge portions that overlap edge portions of the red color filter elements and edge portions of the blue color filter elements.

8. The display defined in claim 1 further comprising upper and lower polarizer layers, wherein the thin-film transistor layer, the color filter layer substrate, and the liquid crystal layer are interposed between the upper and lower polarizer layers.

9. The display defined in claim 8 further comprising a layer of indium tin oxide between the upper polarizer layer and the color filter layer substrate.

10. The display defined in claim 9 wherein the color filter layer substrate comprises a glass layer.

11. The display defined in claim 10 wherein the thin-film transistor layer comprises display pixel electrodes.

12. A display having an active area surrounded by an inactive area, comprising:
    a layer of liquid crystal material;
    a plurality of display layers through which light passes, wherein the display layers include a color filter layer substrate having an inner surface that faces the layer of liquid crystal material; and
    an array of color filter elements in the active area on the inner surface, wherein the array of color filter elements includes red color filter elements, green color filter elements, and blue color filter elements; and
    a black matrix in the active area and the inactive area on the color filter layer substrate, wherein the black matrix includes a grid of blue polymer material in the active area on the inner surface and a grid of black polymer material in the active area on the grid of blue polymer material, and a layer of blue polymer material in the inactive area and a layer of black polymer material covering the layer of blue polymer material in the inactive area,
    wherein some of the color filter elements overlaps the grid of blue polymer material and the grid of black polymer material in a vertical direction, and
    wherein the layer of black polymer material is in contact with the layer of blue polymer material, and extends to a lower surface of an outermost color filter element of the array of color filter elements.

13. The display defined in claim 12 wherein the color filter element material includes edge portions of the color filter elements.

14. The display defined in claim 12 wherein the layer of blue polymer material is formed on the inner surface, the layer of black polymer material is on the blue polymer material.

15. The display defined in claim 14 wherein the grid of blue polymer material includes at least some blue photoresist patterned with a halftone mask.

16. A liquid crystal display having an active area surrounded by an inactive area comprising:
   a thin-film transistor layer having thin-film transistors on a thin-film substrate layer;
   a color filter layer having a color filter layer substrate; and
   a layer of liquid crystal material between the thin-film transistor layer and the color filter layer, wherein the color filter layer comprises a black masking layer, wherein the black masking layer comprises a grid of blue photoresist in the active area and an aligned grid of black photoresist under the grid of blue photoresist in the active area, and a blue photoresist layer in the inactive area and a black photoresist layer covering the blue photoresist layer in the inactive area,
   wherein the grid of blue photoresist and the aligned grid of black photoresist have openings, wherein the color filter layer comprises an array of color filter elements including red, green, and blue color filter elements that overlap the openings, wherein at least parts of the color filter elements are over the aligned grid of black photoresist and under the grid of blue photoresist, and wherein the color filter elements and the aligned grid of black photoresist are covered with an overcoat layer, and
   wherein the black photoresist layer is in contact with the blue photoresist layer, and extends to a lower surface of an outermost color filter element of the array of color filter elements.

17. The liquid crystal display defined in claim 16 wherein the openings comprise rectangular openings and wherein blue color filter elements include edge portions between the grid of blue photoresist and the aligned grid of black photoresist.

18. The liquid crystal display defined in claim 16 further comprising:
   a polarizer; and
   an indium-tin-oxide layer between the polarizer and the color filter substrate layer.

* * * * *